(12) United States Patent
Xi

(10) Patent No.: US 12,262,813 B2
(45) Date of Patent: Apr. 1, 2025

(54) LOCKING ASSEMBLY, DRAWER ASSEMBLY AND STORAGE CABINET

(71) Applicants: HEFEI MIDEA REFRIGERATOR CO., LTD., Hefei (CN); HEFEI HUALING CO., LTD., Hefei (CN); MIDEA GROUP CO., LTD., Foshan (CN)

(72) Inventor: Yongxue Xi, Hefei (CN)

(73) Assignees: HEFEI MIDEA REFRIGERATOR CO., LTD.; HEFEI HUALING CO., LTD., Hefei (CN); MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 17/926,118

(22) PCT Filed: Dec. 29, 2021

(86) PCT No.: PCT/CN2021/142530
§ 371 (c)(1),
(2) Date: Nov. 17, 2022

(87) PCT Pub. No.: WO2023/273261
PCT Pub. Date: Jan. 5, 2023

(65) Prior Publication Data
US 2024/0225275 A1 Jul. 11, 2024

(30) Foreign Application Priority Data
Jun. 29, 2021 (CN) .......................... 202110729923.0

(51) Int. Cl.
*A47B 88/50* (2017.01)
*A47B 88/457* (2017.01)
*A47B 88/90* (2017.01)

(52) U.S. Cl.
CPC ............ *A47B 88/50* (2017.01); *A47B 88/457* (2017.01); *A47B 88/90* (2017.01); *A47B 2088/901* (2017.01)

(58) Field of Classification Search
CPC ....... A47B 88/50; A47B 88/457; A47B 88/90; A47B 2088/901; A47B 2210/175;
(Continued)

(56) References Cited

U.S. PATENT DOCUMENTS 9,310,126 B2 *  4/2016  Yi ........................ F25D 23/067
9,657,984 B2 *  5/2017  Wang .................... F25D 23/04
(Continued)

FOREIGN PATENT DOCUMENTS

CN  106610163 A  5/2017
CN  106848900 A  6/2017
(Continued)

OTHER PUBLICATIONS

ISR mailed Mar. 28, 2022 for PCT Application No. PCT/CN2021/142530.
(Continued)

*Primary Examiner* — Hanh V Tran

(57) ABSTRACT

The present application relates to the field of household appliances, and in particular to a locking assembly, a drawer assembly and a storage cabinet. The locking assembly includes: a mounting member, a locking member rotatably connected to the mounting member and configured to be switched between a locked state and an unlocked state, and the locking member includes a locking portion and an unlocking portion; in the locked state, at least part of the locking portion is located at a motion path of a to-be-locked member and the unlocking portion is located at an avoidance path of the to-be-locked member; and in the unlocked state, the locking portion is located at the avoidance path and at
(Continued)

least part of the unlocking portion is located at the motion path.

13 Claims, 10 Drawing Sheets

(58) Field of Classification Search
CPC ....... A47B 57/06; A47B 88/477; A47B 81/00; F25D 25/025; F25D 25/04; Y02T 10/70; Y02T 10/7072
See application file for complete search history.

(56) References Cited

U.S. PATENT DOCUMENTS

| | | | | |
|---|---|---|---|---|
| 10,330,371 | B2* | 6/2019 | Jung | F25D 25/022 |
| 11,266,237 | B2* | 3/2022 | Chen | H05K 7/1489 |
| 11,721,157 | B2* | 8/2023 | Van Schothorst | G07F 11/04 221/1 |
| 12,066,243 | B2* | 8/2024 | Sim | F25D 25/02 |
| 2015/0250312 | A1* | 9/2015 | Barrett | E05B 47/023 312/319.1 |
| 2015/0300728 | A1* | 10/2015 | Kim | F25D 25/02 312/408 |
| 2016/0047594 | A1* | 2/2016 | Choo | F25D 25/02 312/404 |
| 2017/0284729 | A1* | 10/2017 | Lim | F25D 23/04 |

FOREIGN PATENT DOCUMENTS

| | | | | |
|---|---|---|---|---|
| CN | 107232815 | A * | 10/2017 | A47B 88/40 |
| CN | 108487790 | A | 9/2018 | |
| CN | 108775141 | A * | 11/2018 | E04G 3/28 |
| CN | 208344299 | U | 1/2019 | |
| CN | 109506414 | A | 3/2019 | |
| CN | 110271787 | A | 9/2019 | |
| CN | 106766602 | B | 11/2019 | |
| CN | 110749156 | A | 2/2020 | |
| CN | 211154617 | U | 8/2020 | |
| CN | 211364281 | U | 8/2020 | |
| CN | 111721054 | A | 9/2020 | |
| CN | 108195130 | B * | 10/2020 | F25D 23/028 |
| CN | 211722249 | U | 10/2020 | |
| CN | 213020506 | U | 4/2021 | |
| CN | 213020508 | U | 4/2021 | |
| CN | 113261794 | A | 8/2021 | |
| CN | 219491849 | U * | 8/2023 | |
| DE | 102008014885 | A1 * | 9/2009 | F25D 23/04 |
| EP | 2265875 | A1 | 12/2010 | |
| EP | 2903100 | A1 * | 8/2015 | B60L 11/1816 |
| EP | 2937652 | A1 | 10/2015 | |
| EP | 3244148 | A1 * | 11/2017 | F25D 11/02 |
| JP | 2007231597 | A | 9/2007 | |
| JP | 2009052298 | A | 3/2009 | |
| JP | 2017210322 | A | 11/2017 | |
| TW | 1712379 | B * | 12/2020 | |

OTHER PUBLICATIONS

1st Search Report mailed Apr. 6, 2022 of priority application CN202110729923.0.
EESR received in EP Application No. 21943310.9; mailed Nov. 27, 2023.

* cited by examiner

LOCKING ASSEMBLY, DRAWER ASSEMBLY AND STORAGE CABINET

CROSS-REFERENCES TO RELATED APPLICATIONS

The present disclosure is a national phase application of International Application No. PCT/CN2021/142530, filed on Dec. 29, 2021, which claims priority to Chinese patent application No. 202110729923.0 filed on Jun. 29, 2021, the entireties of which are herein incorporated by reference.

FIELD

The present application relates to the field of household appliances, and in particular to a locking assembly, a drawer assembly and a storage cabinet.

BACKGROUND

In related art, most of the storage cabinets include a lifting drawer. Taking a refrigerator as an example, a lifting drawer in the refrigerator is usually suspended in the following ways. One way is to lock the lifting drawer depending on the expensive motor's braking function, which is high in cost and will weaken the durability of the structure since the whole drive system maintains the loaded state for a long time, and the motor brake cannot be reset after power off. The other way is to use the locking function of the stepper motor or servo motor itself. However, the stepper motor or servo motor needs to be continuously powered up to maintain the locking function of the stepper motor or servo motor itself in practice, which will lead to serious heating of the motor and the suspending state of the lifting drawer cannot be maintained for a long time, and the motor needs a large heat-dissipation space to dissipate heat.

SUMMARY

The present application is intended to address at least one of problems in the related art. The present application provides a locking assembly; without depending on a drive member, the locking assembly is capable of ensuring both the suspending of a to-be-locked member and an automatic reset of the locking member for the next use in a case that the power is off, and it has advantages of simple structure, low cost, small space occupation and wide range of application, and the to-be-locked member can be suspended for a long time without consuming energy.

The present application further provides a drawer assembly.

The present application further provides a storage cabinet.

According to a first aspect of the present application, a locking assembly is provided, which includes:
a mounting member,
a locking member, rotatably connected to the mounting member and configured to be switched between a locked state and an unlocked state, where the locking member includes a locking portion and an unlocking portion,
in the locked state, at least part of the locking portion is located at a motion path of a to-be-locked member and the unlocking portion is located at an avoidance path of the to-be-locked member; and in the unlocked state, the locking portion is located at the avoidance path and at least part of the unlocking portion is located at the motion path.

According to the locking assembly of the present application, in the unlocked state, the to-be-locked member keeps moving and presses the unlocking portion to make the locking portion stretch, and thus at least part of the locking portion is located at the motion path to lock the to-be-locked member, and then the to-be-locked member can be maintained in the suspending state without depending on a drive member. In the case of power off, it is still possible to ensure both the suspending of the to-be-locked member and the automatic reset of the locking member for the next use. The locking assembly has advantages of simple structure, low cost, small space occupation and wide range of application, and the to-be-locked member can be suspended for a long time without consuming energy. In addition, the locking portion and the unlocking portion can be stretched and retracted more stably and reliably and the to-be-locked member can be suspended more stably because the locking member and the mounting member are rotatably connected.

According to an embodiment of the present application, the locking assembly further includes:
an elastic member, having an end rotatably connected to the mounting member and another end rotatably connected to the locking member;
where in the unlocked state, the elastic member is in a compressed state to make the locking member be stuck.

According to an embodiment of the present application, the mounting member includes a guide groove, the locking assembly further includes:
an elastic member, having a first end fixed to a bottom wall of the guide groove and a second end slidably matched with the guide groove;
a state switching member, having an end rotatably connected to the second end and another end rotatably connected to the locking member,
where in the unlocked state, the elastic member is in a compressed state to make the locking member be stuck.

According to an embodiment of the present application, the locking member is connected to the state switching member at a first point of rotation, the locking member is connected to the mounting member at a second point of rotation, the state switching member is connected to the elastic member at a third point of rotation; the locking member is configured to be switched between the locked state, a critical state and the unlocked state, where the critical state is a state in which the first point of rotation, the second point of rotation and the third point of rotation are located on the same straight line.

According to an embodiment of the present application, the elastic member has a first deformation amount in the locked state and the elastic member is in a deformed state in the unlocked state.

According to an embodiment of the present application, the mounting member includes a mounting housing and a mounting base, an inner wall of the mounting housing defines a mounting cavity in which the mounting base is located, and the locking member is rotatably connected to the mounting base; and
in the locked state, at least part of the locking portion stretches out of the mounting cavity and the unlocking portion is located in the mounting cavity; and in the unlocked state, the locking portion is located in the mounting cavity and at least part of the unlocking portion stretches out of the mounting cavity.

According to an embodiment of the present application, the mounting member includes a mounting base, and the locking member is rotatably connected to the mounting base.

According to an embodiment of the present application, the locking member includes a manipulator configured to drive the locking member to switch from the locked state to the unlocked state, and the mounting member includes an operating hole for the manipulator.

According to an embodiment of the present application, one of the locking member and the mounting member is provided with a cushioning member; and the cushioning member abuts against the other of the locking member and the mounting member in the locked state.

According to a second aspect of the present application, a drawer assembly is provided, which includes:

locking assemblies according to the first aspect of the present application and a lifting platform, the number of the locking assemblies is two, and the two locking assemblies are located on the left and right sides of the lifting platform, respectively; outer side walls of both the mounting housings together define a lifting space, the lifting platform is liftably provided in the lifting space and configured to be switched between a suspending state and a free state; and the lifting platform includes a locking groove, and at least part of the locking portion matches in the locking groove in the suspending state.

The drawer assembly according to an embodiment of the second aspect of the present application has an effect similar to that of the locking assembly of the first aspect of the present application, which will not be repeated herein.

According to an embodiment of the present application, a bottom of the lifting platform includes a reset member, configured to push the locking portion or the unlocking portion during the lifting and lowering of the lifting platform, to make the locking member be switched between the locked state and the unlocked state.

According to an embodiment of the present application, the reset member includes a reset plate or a reset roller.

According to an embodiment of the present application, an inner drawer for storage is provided on the lifting platform and is configured to be lifted and lowered as the lifting platform is lifted or lowered.

According to a third aspect of the present application, a storage cabinet is provided, which includes the drawer assembly according to the second aspect of the present application.

The storage cabinet according to an embodiment of the third aspect of the present application has a similar effect to that of the locking assembly of the first aspect of the present application, which will not be repeated herein.

The additional aspects and advantages of this application will be partially given in the following description, and some thereof will become obvious from the following description, or be understood through the practice of this application.

BRIEF DESCRIPTION OF THE DRAWINGS

In order to more clearly illustrate solutions disclosed in the embodiments of the present application or the related art, the drawings used in the descriptions of the embodiments or the related art will be briefly described below. The drawings in the following description are only certain embodiments of the present application, and other drawings can be obtained according to these drawings without creative work for those skilled in the art.

Figure 1:
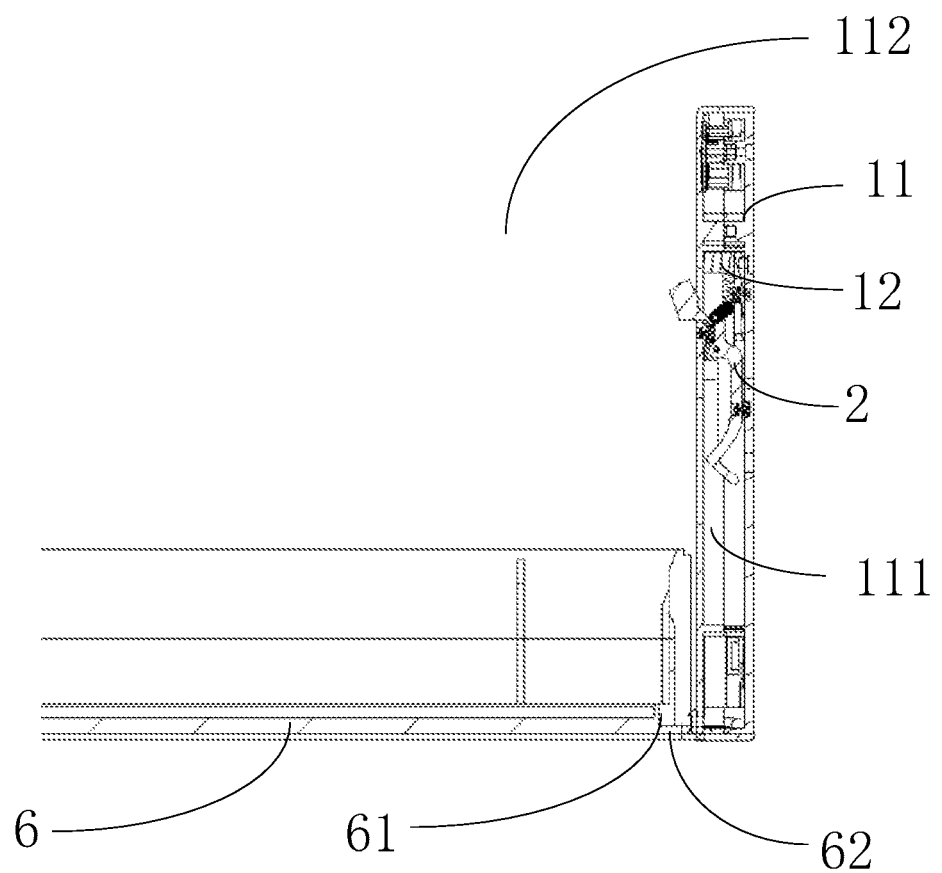
FIG. 1 is a schematic structural diagram of a drawer assembly when a lifting platform is in an initial state according to an embodiment of the present application.

Reference numerals: 1—mounting member; 11—mounting housing; 111—mounting cavity; 112—lifting space; 12—mounting base; 13—guide groove; 2—locking member; 21—locking portion; 22—unlocking portion; 221—manipulator; 3—elastic member; 4—state switching member; 51—first cushioning member; 52—second cushioning member; 53—third cushioning member; 6—lifting platform; 61—locking groove; 62—reset member; 7—inner drawer.

DETAILED DESCRIPTION OF THE DISCLOSURE

Embodiments of the present application are further described in detail below with reference to the drawings and embodiments. The following embodiments are intended to illustrate the application, but are not intended to limit the scope of the application.

In the description of the embodiments of the present application, it is to be noted that the orientation or positional relationships indicated by terms such as "center", "longitudinal", "lateral", "upper", "lower", "front", "rear", "left", "right", "vertical", "horizontal", "top", "bottom", "inside", "outside", etc. are based on the orientation or positional relationship shown in the drawings, and are merely for the convenience of describing the embodiments of the present application and simplifying the description and thus is not to be construed as limiting the embodiments of the present application. Moreover, the terms "first", "second", "third", and the like are used for descriptive purposes only and are not to be construed as indicating or implying relative importance.

In the embodiments of this application, the first feature being located "on" or "under" the second feature means that the first feature is in direct contact with the second feature or the first feature is in contact with the second feature by an intervening media. Also, the first feature being located "on", "above" and "on top of" the second feature may mean that the first feature is directly on or above the second feature, or it simply means that the level of the first feature is higher than the second feature. The first feature being located "under", "below" and "on bottom of" the second feature may mean that the first feature is directly under or below the second feature, or it simply means that the level of the first feature is lower than the second feature.

In the description of this specification, descriptions with reference to the terms "one embodiment", "some embodiments", "examples", "specific examples", or "some examples" etc. mean that specific features, structure, materials or characteristics described in conjunction with the embodiment or example are included in at least one embodiment or example of the embodiments of the present application. In this specification, the schematic expressions of the above terms do not necessarily refer to the same embodiment or example. Also, the described specific features, structures, materials or characteristics can be combined in any one or more embodiments or examples in a suitable manner. In addition, those skilled in the art may integrate and combine the different embodiments or examples and the features of the different embodiments or examples described in this specification without contradicting each other.

Before describing the locking assembly of the present application, the application scenarios of the locking assembly are first introduced. The locking assembly according to the present application can be applied to both locking and unlocking of lifting parts as well as locking and unlocking of other sliding parts other than lifting parts, and the locking assembly can be applied to furniture, such as tables, cabinets, etc., or to appliances, such as refrigerators, retail cabinets, etc. The locking assembly according to the present application can also be used in other application scenarios, which are not specifically described in the present application as long as the to-be-locked member can be locked and unlocked by the locking assembly. The to-be-locked member here and hereinafter refers to a member such as a lifting member or a sliding member, etc. which is locked at a specific position in case of the locked state of the locking member 2, and can move freely on the motion path in case of the unlocked state of the locking member 2.

The locking assembly according to an embodiment of the present application is described below with reference to the accompanying drawings.

As shown in FIGS. 1 to 10, a locking assembly according to an embodiment of the present application includes a mounting member 1 and a locking member 2.

The locking member 2 is rotatably connected to the mounting member 1 and configured to be switched between a locked state and an unlocked state, and the locking member 2 has a locking portion 21 and an unlocking portion 22.

In the locked state, at least part of the locking portion 21 is located at a motion path of a to-be-locked member and the unlocking portion 22 is located at an avoidance path of the to-be-locked member.

In the unlocked state, the locking portion 21 is located at the avoidance path and at least part of the unlocking portion 22 is located at the motion path.

According to the locking assembly of the present application, it is assumed that the locking member 2 is initially in the locked state and the to-be-locked member is located at a starting point of the motion path, the to-be-locked member moves along the motion path and is locked by the locking member 2 when the to-be-locked member moves to a position corresponding to the locking member 2, and the to-be-locked member then continues to move along the motion path and thus the locking member 2 is switched to the unlocked state and then the to-be-locked member moves in an opposite direction. Since at least part of the unlocking portion 22 is located at the motion path, the unlocking portion 22 will be pressed by the to-be-locked member during the motion of the to-be-locked member in the opposite direction and thus the locking portion 21 is stretched out, and then at least part of the locking portion 21 is located at the motion path to lock the to-be-locked member in the next motion cycle. Therefore, the suspending state of the to-be-locked member can be maintained without depending on the drive member. In the case of power off, it is still possible to ensure the suspending of the to-be-locked member and the automatic reset of the locking portion 21 of the locking member 2 to the motion path for the next use. The locking assembly has simple structure, low cost, small space occupation, and large application range, and the to-be-locked member can be suspended for a long time without consuming energy. The locking portion 21 and unlocking portion 22 can be stretched and retracted more stably and reliably and the to-be-locked member is suspended more stably since the locking member 2 is rotatably connected to the mounting member 1.

The "motion path of the to-be-locked member" refers to a range through which the to-be-locked member passes when moving by manual or electric drive; the "avoidance path of the to-be-locked member" refers to a range beyond the motion path of the to-be-locked member, i.e. the range in which the motion of the to-be-locked member is not affected.

In an embodiment of the present application, the to-be-locked member is provided with a reset member 62 and the reset member 62 can push the locking portion 21 during the motion of the to-be-locked member, and thus the locking member 2 can be switched from the locked state to the unlocked state. For example, the to-be-locked member is provided with a locking groove 61, the reset member 62 is located under the locking groove 61 and the locking portion 21 matches in the locking groove 61 in the locked state.

In an embodiment, the working process of the locking assembly is as follows: assuming that the to-be-locked member makes lifting and lowering motion and is initially located at the starting point of the motion path (i.e., the lowermost part of the motion path) and the locking member 2 is initially in the locking state, the to-be-locked member moves along the motion path, and is locked by the locking member 2 when moving to a position corresponding to the locking member 2. The to-be-locked member then continues to be lifted along the motion path, the reset member 62 pushes the locking portion 21 and thus the locking member 2 is switched to the unlocked state. Subsequently, the to-be-locked member is lowered in an opposite direction, the unlocking portion 22 will be pressed by the to-be-locked member during the lowering of the to-be-locked member since at least part of the unlocking portion 22 is located at the motion path, and thus the locking portion 21 is stretched out and at least part of the locking portion 21 is located at the motion path to lock the to-be-locked member in the next motion cycle.

It should be noted that the above embodiments are only some of the embodiments of the locking assembly according to the present application, and are intended to enumerate some of the operating processes of the locking assembly, and do not have a specific limiting effect on the locking assembly of the present application.

According to an embodiment of the present application, the switching process from the unlocking state to the locking state is shown as follows. When the to-be-locked member moves on the motion path, since at least part of the unlocking portion 22 is located at the motion path in the unlocking state, the unlocking portion 22 will be pressed by the to-be-locked member when the to-be-locked member moves near the unlocking portion 22, and thus the unlocking portion 22 will move to the avoidance path and the locking portion 21 is driven by the unlocking portion 22 to move from the avoidance path to the motion path to lock the to-be-locked member during the next motion of the to-be-locked member.

According to an embodiment of the present application, the switching process from the locking state to the unlocking state is shown as follows. In order to unlock the to-be-locked member, an external force can be applied to the to-be-locked member to make that the locking portion 21 is pressed by the to-be-locked member and moves to the avoidance path. Alternatively, the unlocking portion 22 can be manually pulled to the motion path to drive the locking portion 21 to move to the avoidance path. Alternatively, the to-be-locked member can be further provided with a reset member 62, and the to-be-locked member can be controlled to keep moving in the unlocked direction and thus the locking portion 21 is pushed to the avoidance path by the reset member 62. In addition, it is also possible to unlock the to-be-locked member in other ways, which are not particularly limited here.

In an embodiment, the locking portion 21 and the unlocking portion 22 are linked to each other. In other words, when the unlocking portion 22 moves, the unlocking portion 22 will drive the locking portion 21 to move; and when the locking portion 21 moves, the locking portion 21 will drive the unlocking portion 22 to move. For example, the position change relationship between the locking portion 21 and the unlocking portion 22 is as follows: the unlocking portion 22 will drive the locking portion 21 to move to the motion path when the unlocking portion 22 moves to the avoidance path; the unlocking portion 22 will drive the locking portion 21 to move to the avoidance path when the unlocking portion 22 moves to the motion path; the locking portion 21 will drive the unlocking portion 22 to move to the motion path when the locking portion 21 moves to the avoidance path; and the locking portion 21 will drive the unlocking portion 22 to move to the avoidance path when the locking portion 21 moves to the motion path.

In an embodiment of the present application, the locking portion 21 and the unlocking portion 22 extend at an angle toward the same side. For example, as shown in FIG. 2, the middle part of the locking member 2 is rotatably connected to the mounting member 1, the upper part of the locking member 2 forms the locking portion 21, the lower part of the locking member 2 forms the unlocking portion 22, the unlocking portion 22 extends at an angle toward the lower left, and the locking portion 21 extends at an angle toward the upper left.

Figure 2:
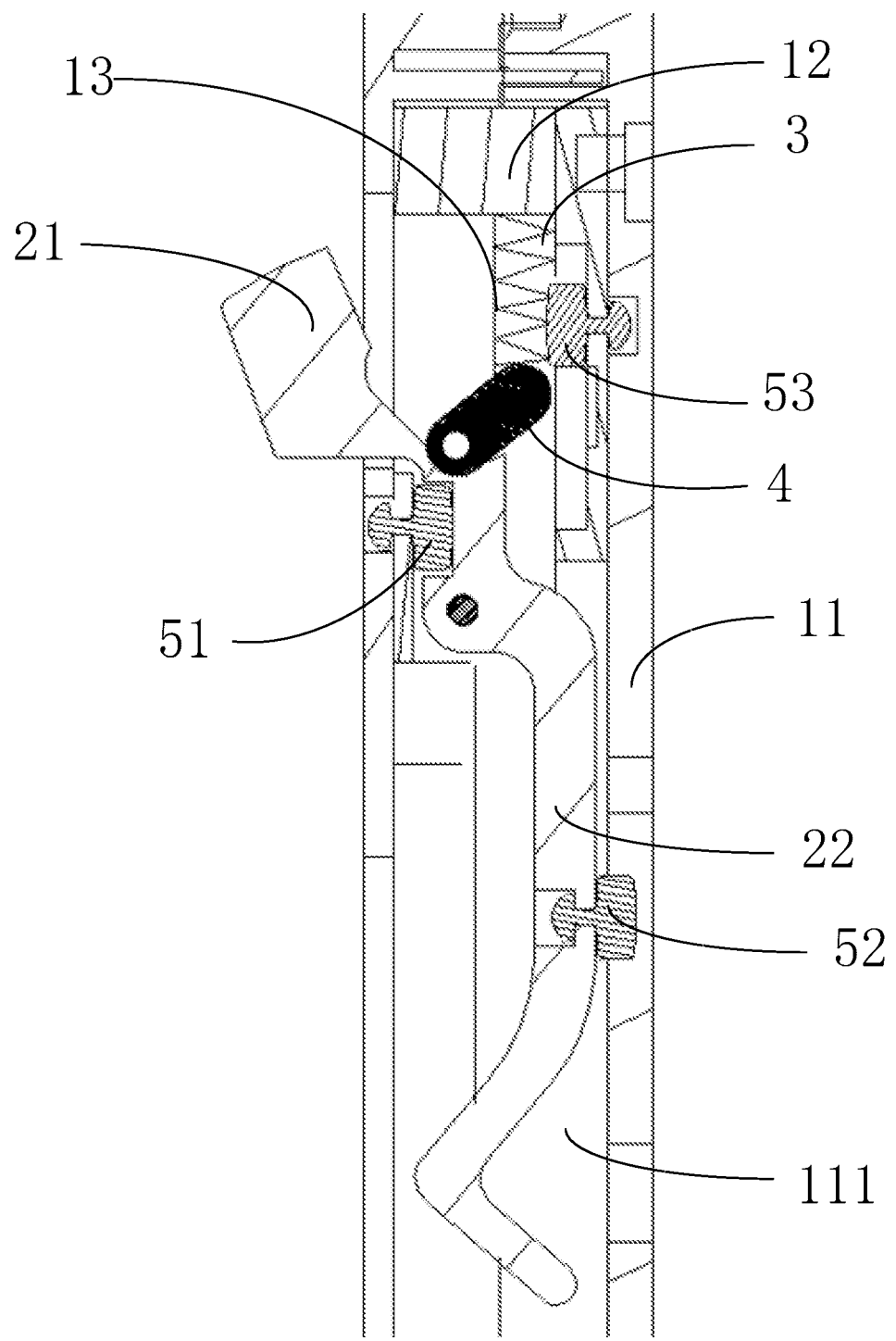
FIG. 2 is a partial enlarged view of FIG. 1.
Figure 3:
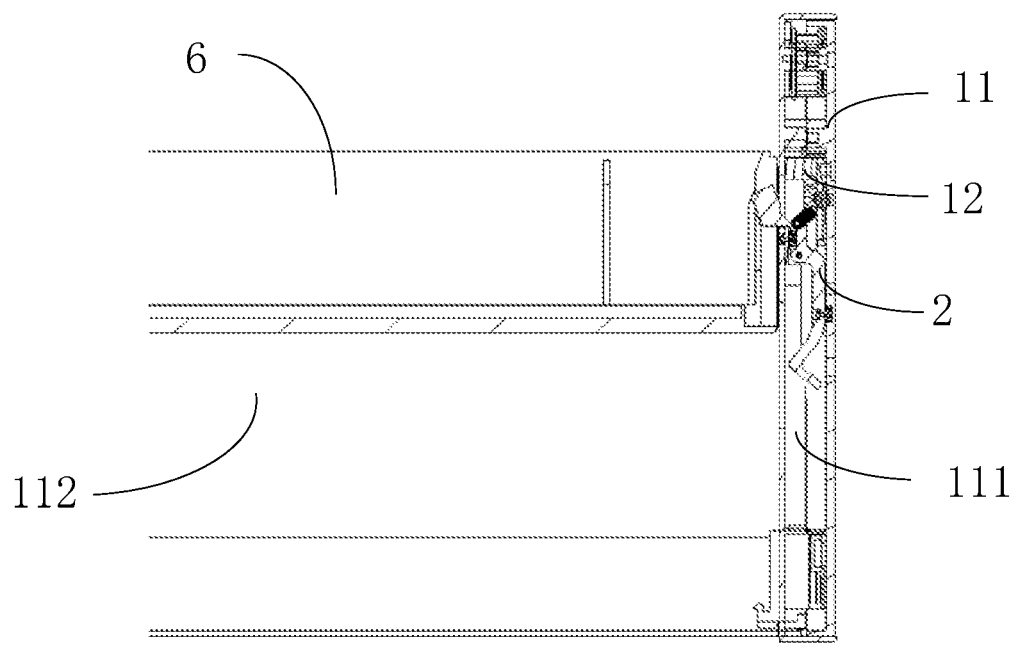
FIG. 3 is a schematic structural diagram of a drawer assembly during a lifting process of a lifting platform according to an embodiment of the present application.

As shown in FIG. 2, according to an embodiment of the present application, the locking assembly further includes an elastic member 3. An end of the elastic member 3 is rotatably connected to the mounting member 1, and another end of the elastic member 3 is rotatably connected to the locking member 2. In the unlocked state, the elastic member 3 is in a compressed state to make the locking member 2 be stuck.

In this case, the elastic member 3 makes the overall structure more stable, the locking member 2 can maintain better stability in both the unlocked and locked states, and the state of the locking member 2 is prevented from changing due to the interference of adverse factors.

For example, the end of the elastic member 3 connected to the mounting member 1 is referred to as a fixed end, and the end of the elastic member 3 connected to the locking member 2 is referred to as a free end. The free end is rotated around the fixed end, and the free end has two positions in stable state (i.e., the state of force balance), and the two positions include a first elastic member position corresponding to the locking state and a second elastic member position corresponding to the unlocking state.

In the first elastic member position, the elastic member 3 is in a compressed state and has a first deformation amount, and at least part of the locking member 2 abuts against the mounting member 1. In this case, the entire locking member 2 is in a stable state (i.e. a state of force balance) under the support force of the mounting member 1 and elastic force of the elastic member 3 and the locking portion 21 can be kept at the motion path if there is no external influence factors, i.e. the locking member 2 remains in the locking state to lock the to-be-locked member.

In the second elastic member position, the elastic member 3 is in a compressed state and has a second deformation amount, and at least part of the locking member 2 abuts against the mounting member 1. In this case, the entire locking member 2 is in a stable state (i.e. a state of force balance) under the support force of the mounting member 1 and elastic force of the elastic member 3 and the locking portion 21 can be kept at the avoidance path if there is no external influence factors, i.e. the locking member 2 remains in the unlocking state to unlock the to-be-locked member.

When it is needed to unlock the to-be-locked member, the locking member 2 can be switched to the unlocked state by applying external factors, and the way of applying external factors here has been introduced above and will not be repeated here. When it is needed to lock the to-be-locked member, the to-be-locked member moves and presses the unlocking portion 22 and thus the unlocking portion 22 is pressed back to the avoidance path, which will drive the locking member 2 to move to the motion path to automatically lock the to-be-locked member in the next motion cycle.

In an embodiment, the locking member 2 has a critical state between the locking state and the unlocking state. In the present embodiment, it is assumed that the locking member 2 is connected to the elastic member 3 through a first rotation center, and is connected to the mounting member 1 through a second rotation center. In the critical state, the fixed end of the elastic member 3, the first rotation center and the second rotation center are all located on the same straight line. In this case, the locking member 2 is in a state of force balance since the elastic member 3 only applies an elastic force to the locking member 2 in the direction of a rotation diameter of the locking member 2. For example, the to-be-locked member is initially located at the starting point of the motion path and the locking member 2 is initially in the locking state, the to-be-locked member moves to the position corresponding to the locking member 2 and continues to move, the to-be-locked member pushes the locking member 2 to rotate clockwise to make the locking portion 21 move away from the motion path. The state of the locking member 2 will be switched from the locking state to the critical state during the clockwise rotate. Since the to-be-locked member continues to move, the external force applied to the locking member 2 by the to-be-locked member will break the force balance of the locking member 2 in the critical state, and the locking member 2 will continue to rotate clockwise and finally be switched to the unlocked state.

The switching processes of the locking member 2 from the unlocked state to the critical state and the locked state are similar to the process described above, except that the to-be-locked member moves in the opposite direction and a portion pushed by the to-be-locked member is the unlocking portion 22, which is not described here.

As shown in FIG. 2, according to another embodiment of the present application, the mounting member 1 includes a guide groove 13, and the locking assembly further includes an elastic member 3 and a state switching member 4.

A first end of the elastic member 3 is fixed to a bottom wall of the guide groove 13 and a second end of the elastic member 3 is slidably matched with the guide groove 13. An end of the state switching member 4 is rotatably connected to the second end of the elastic member 3 and another end of the state switching member 4 is rotatably connected to the locking member 2.

In the unlocked state, the elastic member 3 is in a compressed state to make the locking member 2 be stuck.

In this case, the addition of the state switching member 4 further increases the stability of the whole structure and makes the state switching process of the locking member 2 more stable than the structure with only the elastic member 3. The specific working process of the locking assembly according to the present embodiment with addition of the state switching member 4 is similar to that of the embodiment with only the elastic member 3, and which will not be repeated here. The specific structure of the locking assembly according to the present embodiment will be further explained in the following embodiments.

According to an embodiment of the present application, the locking member 2 is connected to another end of the state switching member 4 at a first rotation point, the locking member 2 is connected to the mounting member 1 at a second rotation point, and the state switching member 4 is connected to the elastic member 3 at a third rotation point; and the locking member 2 is configured to be switched between the locked state, the critical state and the unlocked state, where in the critical state, the first rotation point, the second rotation point and the third rotation point are located on the same straight line.

In the present embodiment, in the critical state, the locking member 2 is in a state of force balance due to the interaction of the mounting member 1, the elastic member 3, the state switching member 4 and the locking member 2. For example, the to-be-locked member is initially located at the starting point of the motion path and the locking member 2 is initially in the locking state, and the to-be-locked member continues to move after moving to the position corresponding to the locking member 2. The to-be-locked member pushes the locking member 2 to rotate clockwise to make the locking portion 21 move away from the motion path, the locking member 2 will be switched from the locking state to the critical state during the clockwise rotate. In this case, since the to-be-locked member continues to move, the external force applied to the locking member 2 by the to-be-locked member will break the balance of the locking member 2 in the critical state, and the locking member 2 will continue to rotate clockwise and finally be switched to the unlocked state.

The switching processes of the locking member 2 from the unlocked state to the critical state and the locked state are similar to the process described above, except that the to-be-locked member moves in the opposite direction and a portion pushed by the to-be-locked member is the unlocking portion 22, which are not described here. According to an embodiment of the present application, in the locked state, the elastic member 3 has a first deformation amount; and in the unlocked state, the elastic member 3 has a second deformation amount being larger than the first deformation amount.

In this case, since the elastic member 3 is in the deformed state in case of the locked state, the elastic member 3 will apply pressure on the locking member 2 and press the locking member 2 against the mounting member 1, and the locking portion 21 is more stable after stretching out the motion path in the locked state under the action of the elastic force, which ensures that the locking member 2 in the locked state is more stable and reliable, and the to-be-locked member is prevented from pressing the locking portion 21 back to the avoidance path due to its own gravity.

In addition, since the second deformation amount is larger than the first deformation amount, the elasticity of the elastic member 3 can help the locking member 2 quickly reset to the locked state in the process of switching the locking member 2 from the unlocked state to the locked state. For example, when the locking member 2 is switched from the unlocked state to the locked state, the unlocking portion 22 is pressed by the to-be-locked member to exert an external influence on the unlocking portion 22, and thus the stable state of the elastic member 3 in the second elastic member position is broken, and then the locking member 2 is quickly reset to the locked state by the push of the elastic member 3, and the elastic member 3 is kept in the first elastic member position, i.e., the locking member 2 is kept in the locked state.

According to an embodiment of the present application, as shown in FIG. 2, the mounting member 1 includes a mounting housing 11 and a mounting base 12, the inner wall of the mounting housing 11 defines a mounting cavity 111 in which the mounting base 12 is located, and the locking member 2 is rotatably connected to the mounting base 12.

Figure 5:
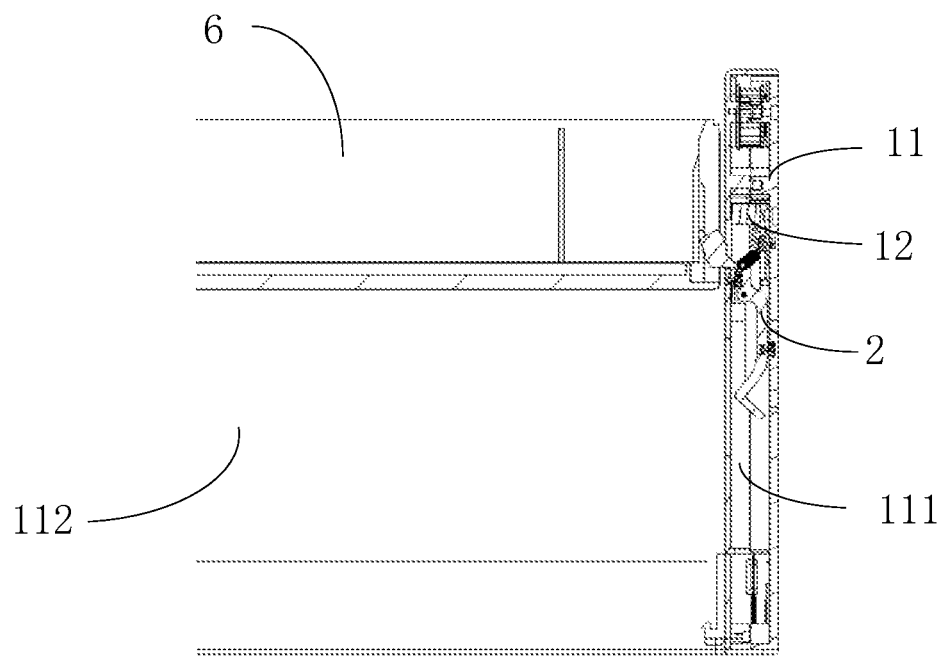
FIG. 5 is a schematic structural diagram of a drawer assembly when a lifting platform is in a suspended state according to an embodiment of the present application.
Figure 7:
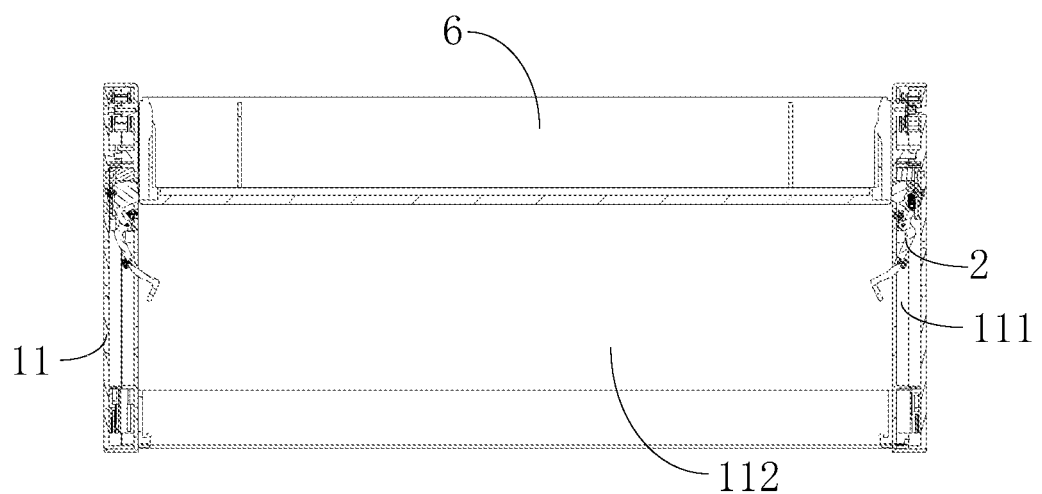
FIG. 7 is a schematic structural diagram of a drawer assembly when a lifting platform is lifted to unlock the locking member according to an embodiment of the present application.

As shown in FIG. 5, in the locked state, at least part of the locking portion 21 stretches out of the mounting cavity 111 and the unlocking portion 22 is located in the mounting cavity 111. As shown in FIG. 7, in the unlocked state, the locking portion 21 is located in the mounting cavity 111 and at least part of the unlocking portion 22 stretches out of the mounting cavity 111.

In this case, the locking portion 21 or the unlocking portion 22 is located at the motion path or the avoidance path by making locking portion 21 and the unlocking portion 22 stretch out of or retract into the mounting cavity 111, which has simple and stable structure and is convenient to assemble.

For example, when the locking portion 21 or the unlocking portion 22 stretches out of the mounting cavity 111, the locking portion 21 or the unlocking portion 22 is at the motion path; and when the locking portion 21 or the unlocking portion 22 retracts into the mounting cavity 111, the locking portion 21 or the unlocking portion 22 is at the avoidance path.

In addition, the mounting base 12 can be a shell-like structure with a cavity or a plate-like structure, and the mounting base 12 can also be other structures, and the present application is not specifically limited herein.

According to an embodiment of the present application, the to-be-locked member is a lifting member, and the outer side wall of the mounting housing 11 encloses to form a lifting space 112 similar to a well, and the lifting member can be lifted and lowered in the lifting space 112. The interior of the mounting housing 11 forms a mounting cavity 111, and the mounting base 12 is located in the mounting cavity 111, and the mounting housing 11 includes two stretching holes. The two stretching holes correspond to the unlocking portion 22 and the locking portion 21 respectively, and thus the unlocking portion 22 and the locking portion 21 can stretch out of or retract into the mounting cavity 111 through the stretching holes.

As shown in FIG. 2, in an embodiment of the present application, the mounting base 12 includes a guide groove 13 extending in the upper and lower directions, the elastic member 3 is a spring and matched in the guide groove 13, the first end of the spring is fixed and the second end of the spring is movable in the guide groove 13. The state switching member 4 is a switching rod, the two ends of the switching rod are rotatably connected to the second end of the spring and the locking member 2 respectively, and the switching rod is connected to the back side of the locking portion 21. In the unlocked state, the spring is in a compressed state, and the spring sticks the locking portion 21 in the mounting cavity 111 by the state switching member 4.

As shown in FIG. 2, in another embodiment of the present application, the elastic member 3 is a spring, and both ends of the spring are rotatably connected to the mounting base 12 and the locking member 2, respectively. In the unlocked state, the spring is in a compressed state, and the spring sticks the locking portion 21 in the mounting cavity 111.

According to an embodiment of the present application, the mounting member 1 includes a mounting base 12, the locking member 2 is rotatably connected to the mounting base 12. In this way, the entire locking assembly can be assembled into the corresponding structure through the mounting base 12, and enables the locking assembly to be used in conjunction with other members.

As shown in FIG. 2, according to an embodiment of the present application, the locking member 2 has a manipulator 221 configured to drive the locking member 2 to switch from the locked state to the unlocked state, and the mounting member 1 has an operating hole (not shown in the figures) for the manipulator 221. In special cases, for example, when the locking member 2 is stuck, it is possible to switch the state of the locking member 2 by operating the manipulator 221.

As shown in FIG. 2, in an embodiment of the present application, an L-shaped operating hook is provided on the free end of the manipulator 221, and then the user can manually switch the state of the locking member 2 by operating the manipulator 221 through the operating hook, which facilitates the user's operation. When the locking member 2 is stuck, the user can manually pull or push the manipulator 221 to switch the state of the locking member 2, or the manipulator 221 can be operated by attaching other auxiliary tools to the operating hook.

According to an embodiment of the present application, a cushioning member is provided on one of the locking member 2 and the mounting member 1 and abuts against the other of the locking member 2 and the mounting member 1 in the locked state.

As shown in FIG. 2, according to an embodiment of the present application, a first cushioning member 51 is provided on the mounting member 1 and a second cushioning member 52 is provided on the locking member 2, and in the locked state, the first cushioning member 51 abuts against the locking member 2 and the second cushioning member 52 abuts against the mounting member 1.

In this case, when the locking member 2 is switched from the locked state to the unlocked state, the second cushioning member 52 can cushion the locking member 2, and the first cushioning member 51 can cushion the locking member 2.

The first cushioning member 51 and the second cushioning member 52 cushion the locking member 2 when the locking member 2 is switched to the locked state respectively, prevent the locking member 2 from colliding directly with the mounting member 1 and avoid the wear and tear caused by the collision between the locking member 2 and the mounting member 1. The first cushioning member 51 and the second cushioning member 52 can be cushion made by rubber or cushion made by other materials, and the material and structure of the first cushioning member 51 and the second cushioning member 52 are not limited in the present application, but only the first cushioning member 51 and the second cushioning member 52 can have a cushioning role.

As shown in FIG. 2, in an embodiment of the present application, inside of the mounting cavity 111 is provided with a third cushioning member 53, and the third cushioning member 53 is configured to cushion the state switching member 4 and prevent the state switching member 4 from being worn out.

As shown in FIG. 2, in an embodiment of the present application, the mounting member 1 includes a mounting housing 11 and a mounting base 12 provided inside the mounting housing 11. A locking member 2 is connected to the mounting base 12, an upper end of the locking member 2 forms a locking portion 21 projecting to the left, and a lower part of the locking member 2 is bent to the left to form an unlocking portion 22. The first cushioning member 51 is provided at the lower left of the locking portion 21, and in the locked state, the first cushioning member 51 abuts against the locking member 2. The second cushioning member 52 is provided at the right side of the unlocking portion 22, and in the locked state, the second cushioning member 52 abuts against the right wall of the mounting cavity 111.

A drawer assembly according to an embodiment of the present application is described below with reference to the accompanying drawings.

As shown in FIGS. 1 to 10, the drawer assembly according to an embodiment of the present application includes: the locking assembly of one of the embodiments of the present application and a lifting platform 6.

The number of the locking assemblies is two which are located on the left and right sides of the lifting platform 6, respectively; outer side walls of both the mounting housings 11 together define a lifting space 112. The lifting platform 6 is liftably disposed in the lifting space 112 and is configured to be switched between a suspending state and a free state. For example, the lifting platform 6 can be lifted and lowered in the lifting space 112. The lifting platform 6 includes a locking groove 61, and at least part of the locking portion 21 matches in the locking groove 61 in the suspending state.

According to the drawer assembly of the present application, it is assumed that the lifting platform 6 is initially located at a starting point of the motion path and the locking member 2 is initially in the locked state, the lifting platform 6 is lifted along the motion path and is locked by the locking member 2 when the lifting platform 6 moves to a position corresponding to the locking member 2, and the lifting platform 6 then continues to be lifted along the motion path and thus the locking member 2 is switched to the unlocked state. Subsequently, the lifting platform 6 is lowered along the motion path, and since at least part of the unlocking portion 22 is located at the motion path, the unlocking portion 22 will be pressed by the lifting platform 6 during the lowering of the lifting platform 6 and thus the locking portion 21 is stretched and thus at least part of the locking portion 21 is located at the motion path to lock the lifting platform 6. Therefore, the suspending state of the lifting platform 6 is maintained without depending on the drive member. In the case of power off, it is still possible to ensure the suspending of the lifting platform 6 and the automatic reset of the locking member 2 for the next use. The drawer assembly has simple structure, low cost, small space occupation, and large application range. The lifting platform 6 can be suspended for a long time without consuming energy. The locking portion 21 and unlocking portion 22 can be stretched and retracted more stably and reliably and the lifting platform 6 can be suspended more stably since the locking member 2 is rotatably connected to the mounting member 1.

It should be noted that in the drawer assembly of the present application, the lifting platform 6 is one of the structures of the to-be-locked member mentioned above. For example, the inner wall of the mounting housing 11 defines a mounting cavity 111 for mounting the locking assembly, the outer side wall of the mounting housing 11 encloses to form a lifting space 112 similar to a well, and the lifting platform 6 can be lifted and lowered within the lifting space 112.

Figure 4:
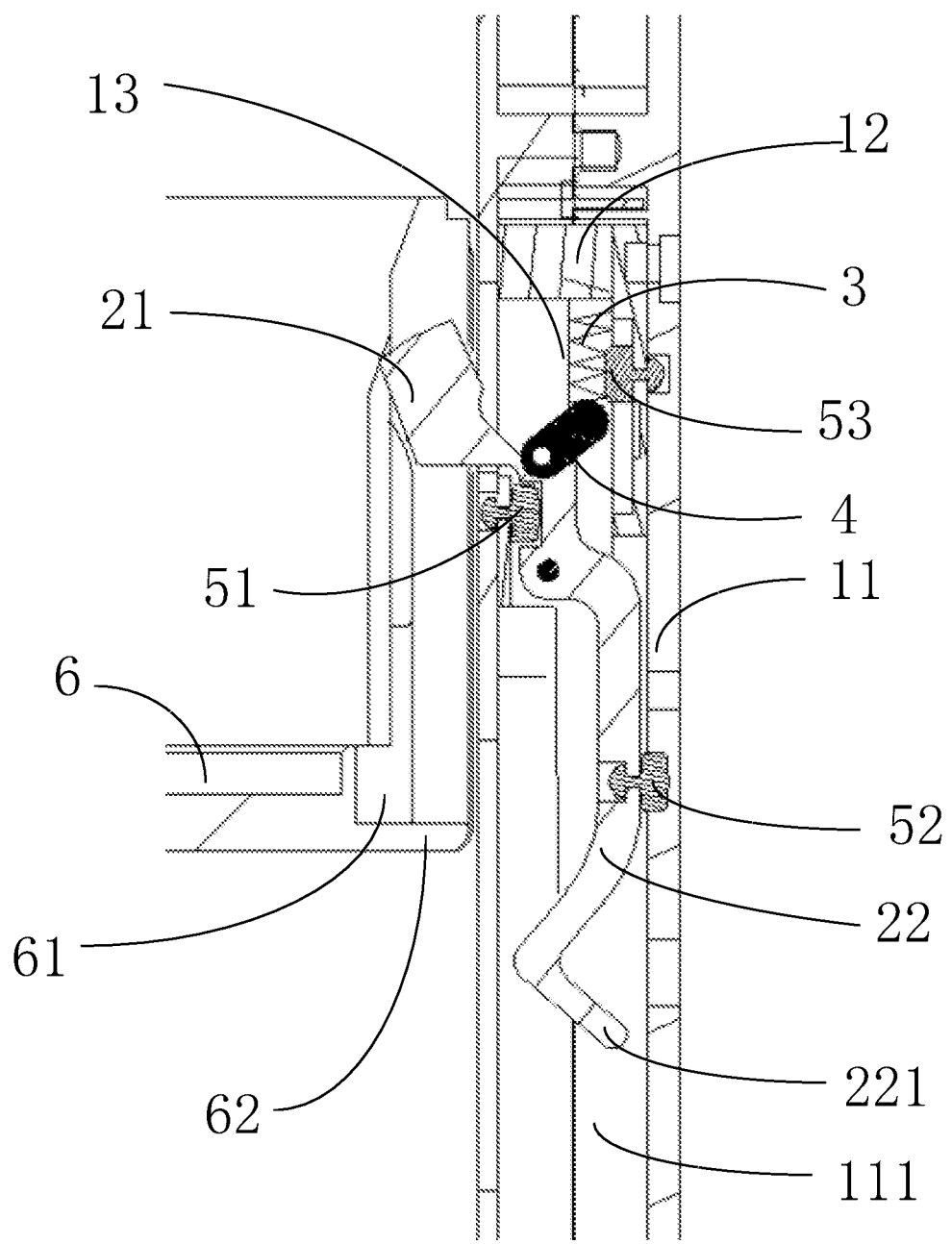
FIG. 4 is a partial enlarged view of FIG. 3.

As shown in FIG. 4, according to an embodiment of the present application, the locking groove 61 is provided on the lifting platform 6, the bottom of the lifting platform 6 further includes a reset member 62 which is configured to push the locking portion 21 or the unlocking portion 22 during the lifting and lowering of the lifting platform 6 and thus the locking member 2 is switched between the locked state and the unlocked state.

In this case, the switching of the locking member 2 between the locked state and the unlocked state can be achieved through the reset member 62.

In an embodiment of the present application, the lifting platform 6 is provided with a reset member 62 and the reset member 62 can push the locking portion 21 during the lifting and lowering of the the lifting platform 6, and thus the locking member 2 can be switched from the locked state to the unlocked state. For example, the lifting platform 6 is provided with a locking groove 61, the reset member 62 is located under the locking groove 61 and the locking portion 21 matches in the locking groove 61 in the locked state.

For example, the working process of the drawer assembly is as follows: assuming that the lifting platform 6 is initially located at the starting point of the motion path (i.e., the lowermost part of the motion path) and the locking member 2 is initially in the locking state, the lifting platform 6 is lifted along the motion path and is locked by the locking member 2 when moving to a position corresponding to the locking member 2. The lifting platform 6 then continues to be lifted along the motion path, the reset member 62 pushes the locking portion 21 and thus the locking member 2 is switched to the unlocked state. Subsequently, the lifting platform 6 is lowered along the motion path, and the unlocking portion 22 will be pressed by the the lifting platform 6 during the lowering of the lifting platform 6 since at least part of the unlocking portion 22 is located at the motion path and thus the locking portion 21 is stretched and at least part of the locking portion 21 is located at the motion path to lock the lifting platform 6 in the next motion cycle.

It should be noted that the above embodiments are only some of the embodiments of the drawer assembly according to the present application, and are intended to enumerate some of the operating processes of the drawer assembly, and do not have a specific limiting effect on the drawer assembly of the present application.

Figure 6:
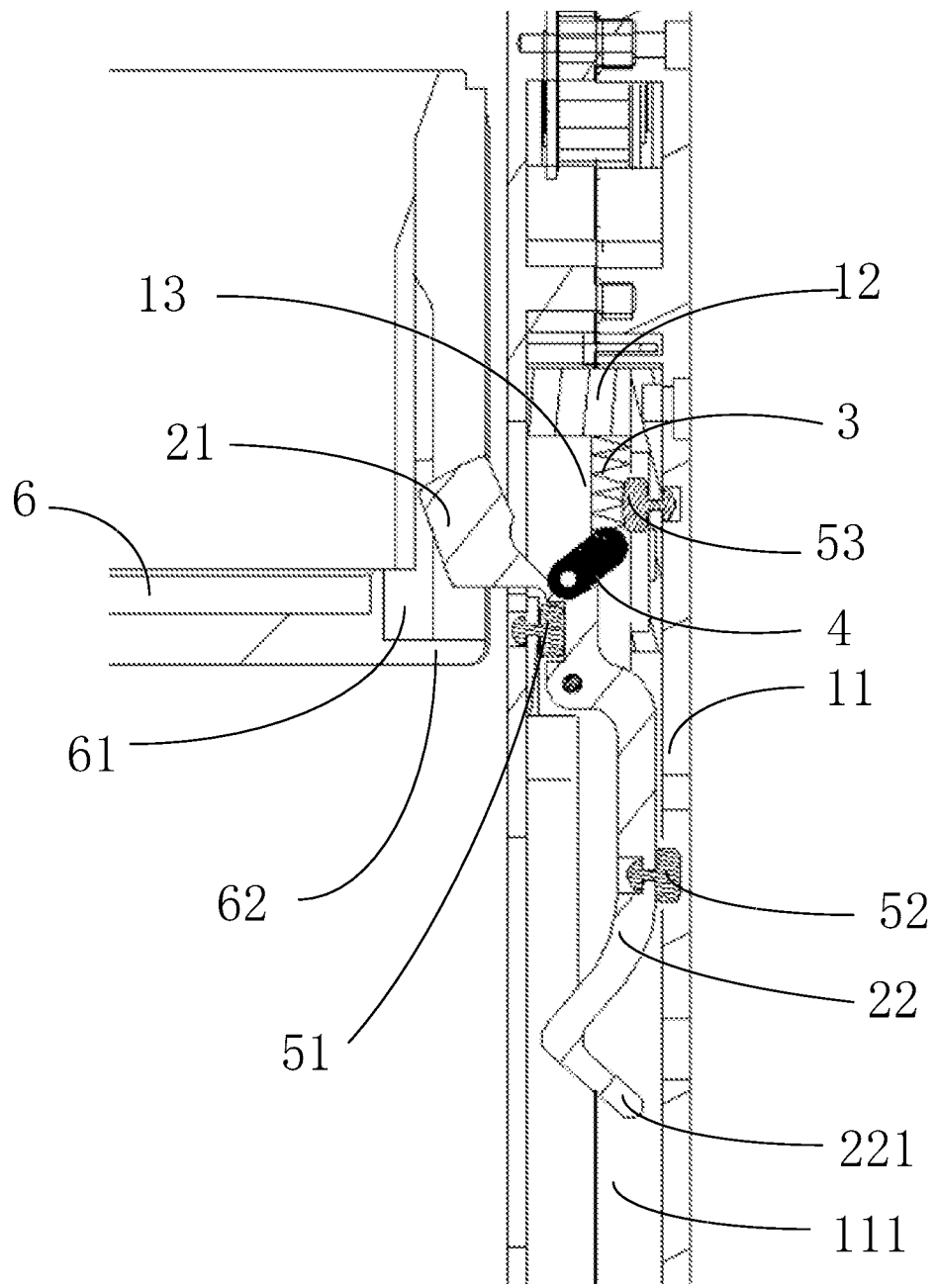
FIG. 6 is a partial enlarged view of FIG. 5.
Figure 8:
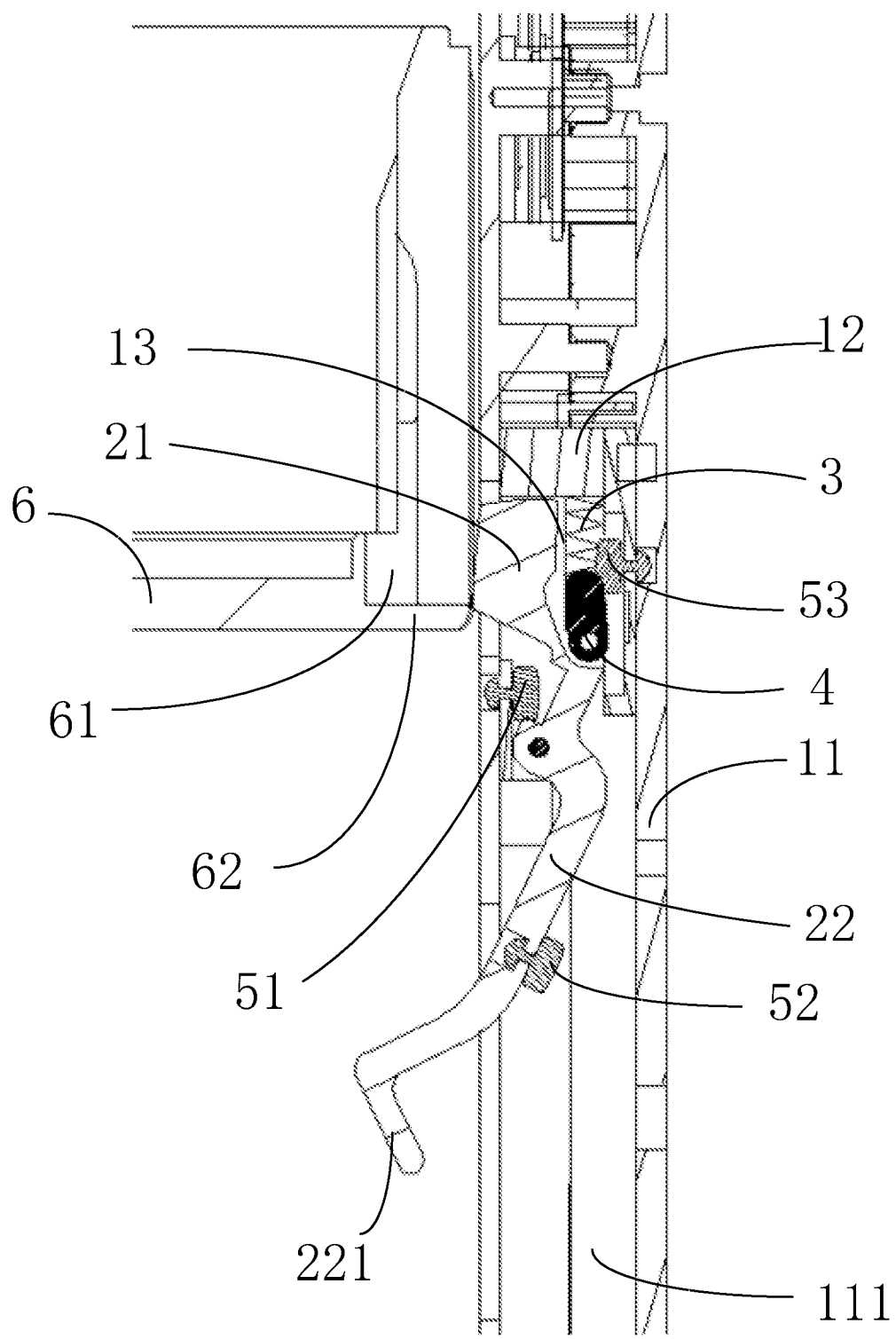
FIG. 8 is a partial enlarged view of FIG. 7.

According to an embodiment of the present application, the switching process from the locked state to the unlocked state is as follows. As shown in FIGS. 5 and 6, in the locked state, at least part of the locking portion 21 matches in the locking groove 61, and in order to switch to the unlocked state, the lifting platform 6 is controlled to continue to lift. In the process of lifting of the lifting platform 6, as shown in FIGS. 7 and 8, the reset member 62 located at the bottom of the lifting platform 6 will pass the locking portion 21, and the reset member 62 will push the locking portion 21 into the mounting housing 11, that is, push the locking portion 21 to the avoidance path, and drive the unlocking portion 22 to stretch out of the mounting housing 11, and thus the locking member 2 is switched to the unlocked state.

Figure 9:
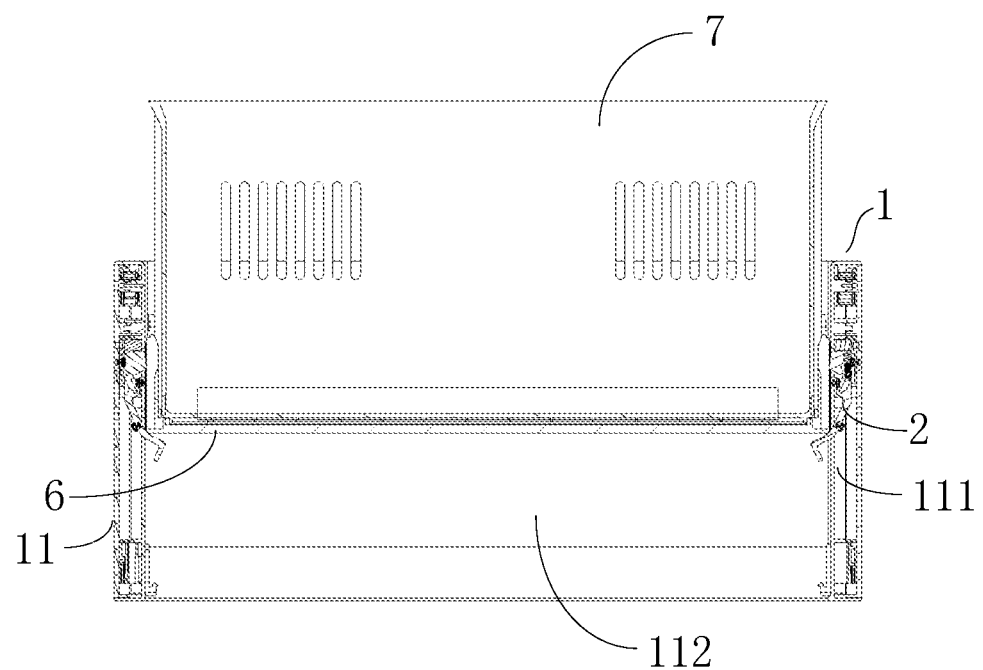
FIG. 9 is a schematic structural diagram of a drawer assembly when a lifting platform is lowered to reset the locking member according to an embodiment of the present application.
Figure 10:
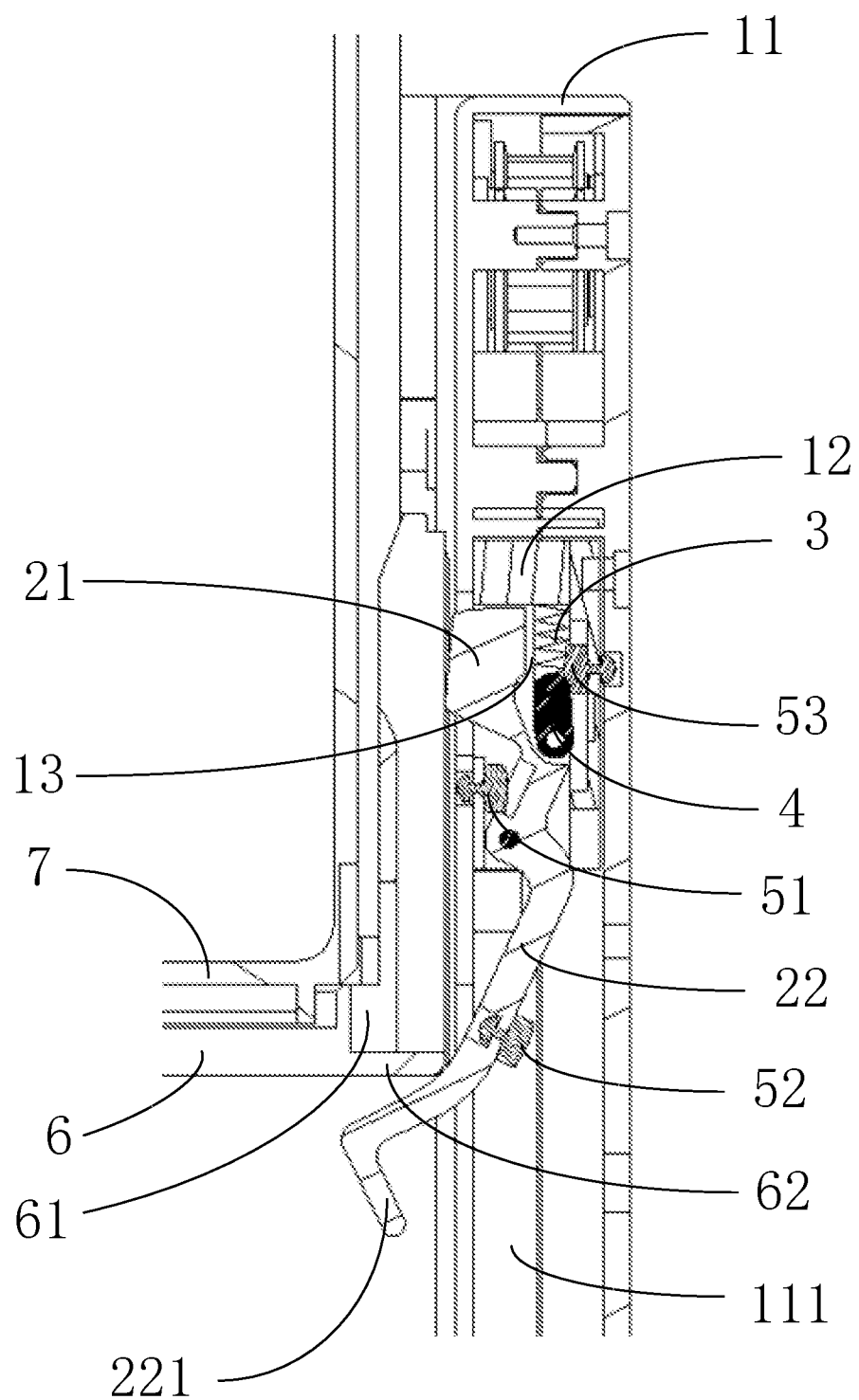
FIG. 10 is a partial enlarged view of FIG. 9.

According to an embodiment of the present application, the switching process from the unlocked state to the locking state is as follows. As shown in FIGS. 9 and 10, in the unlocked state, at least part of the unlocking portion 22 is located at outside of the mounting housing 11, i.e., at the motion path, and the lifting platform 6 passes the unlocking portion 22 in the process of lowering, and the reset member 62 abuts against the unlocking portion 22 in the process of lowering of the lifting platform 6. The reset member 62 pushes the unlocking portion 22 back into the mounting housing 11, i.e. at the avoidance path. The unlocking portion 22 drives the locking portion 21 to stretch out of the mounting housing 11, and thus at least part of the locking member 21 is located at the motion path, and thus the locking member 2 is switched to the locked state. The locking portion 21 can automatically be stuck into the locking groove 61 when the lifting platform 6 is lifted next time and thus the suspending of the lifting platform 6 is provided.

In an embodiment of the present application, the specific structural form of the reset member 62 is not limited, for example, can be reset plate, can be reset roller, or can be reset block, reset rod, reset rib or reset projection and other structures, the embodiment of the present application here not to make special limitations, as long as the reset member 62 can push the locking portion 21 or unlocking portion 22 in the lifting and lowering process of the lifting platform 6.

As shown in FIG. 1, according to an embodiment of the present application, an inner drawer 7 for storage is provided on the lifting platform 6 and is configured to be lifted and lowered as lifting platform 6 is lifted or lowered, which facilitates the manufacture of the lifting platform 6 and the inner drawer 7 and facilitates the assembly of the overall structure.

The storage cabinet according to an embodiment of the present application is described below with reference to the accompanying drawings.

As shown in FIGS. 1 to 10, the storage cabinet according to an embodiment of the present application includes: the drawer assembly of one of the embodiments of the present application.

According to the storage cabinet of the present application, in the unlocked state, the lifting platform 6 keeps moving and presses the unlocking portion 22 to make the locking portion 21 stretch, and thus at least part of the locking portion 21 is located at the motion path to lock the lifting platform 6, and thus the lifting platform 6 can maintain the suspending state without depending on a drive member. In the case of power off, it is still possible to ensure both the suspending of the lifting platform 6 and the automatic reset of the locking member 2 for the next use. The storage cabinet has advantages of simple structure, low cost, small space occupation and wide range of application, and the lifting platform 6 can be suspended for a long time without consuming energy. In addition, the locking portion 21 and the unlocking portion 22 can be stretched and retracted more stably and reliably and the lifting platform 6 can be suspended more stably because the locking member 2 and the mounting member 1 are rotatably connected.

The storage cabinet according to the present application can be a refrigerator, a retail cabinet, a heating cabinet, etc. The present application is not specially limited herein, and the storage cabinet according to the present application can also be other types of storage cabinet.

An embodiment of the storage cabinet according to the present application is described below with reference to the accompanying drawings.

As shown in FIGS. 1 to 10, the storage cabinet is a refrigerator, and the drawer assembly is mounted in the box body of the refrigerator. The drawer assembly includes a locking assembly, a lifting platform 6 and an inner drawer 7 provided on the lifting platform 6. The locking assembly includes a mounting member 1, an elastic member 3, a state switching member 4 and a locking member 2. The number of the locking assemblies is two, and the two locking assemblies are located on the left and right sides of the lifting platform 6, respectively. The number of locking assemblies is not limited by the example here, it can also be any of other numbers, for example, can also be four and the four locking assemblies are provided on the front, rear, left and right sides of the lifting platform 6.

The mounting member 1 includes a mounting housing 11 and a mounting base 12 provided inside the mounting housing 11. The inner side wall of the mounting housing 11 forms a mounting cavity 111, the outer side walls of two mounting housings 11 together define a lifting space 112, and lifting platform 6 can be lifted and lowered in the lifting space 112. The mounting base 12 is located in the mounting cavity 111, and includes a guide groove 13 extending in the up and down direction. The elastic member 3 is a spring, the upper end (i.e., the first end) of the spring is fixed to the bottom wall of the guide groove 13, and the lower end (i.e., the second end) of the spring is able to slide in the guide groove 13. The state switching member 4 is a switching rod having an upper end hinged to the lower end of the spring and a lower end hinged to the locking member 2.

Take the locking assembly located on the right side of the lifting platform 6 as an example, a locking portion 21 protruding toward the left is formed on the upper end of the locking member 2, the middle part of the locking member 2 is hinged to the mounting base 12, and the lower part of the locking member 2 is bent to the left. A locking groove 61 is provided on the right side wall of the lifting platform 6, and a plate-like reset member 62 extending horizontally to the right is provided at the bottom of the lifting platform 6.

In an embodiment, the working process is as follows. It is assumed that the lifting platform 6 is initially located at the bottom of the lifting space 112 and the locking member 2 is in the locked state (as shown in FIGS. 1 and 2), the lifting platform 6 is controlled to be lifted, at least part of the locking portion 21 is stuck into the locking groove 61 and at this time the lifting platform 6 is in a suspending state (as shown in FIGS. 5 and 6). In this process, the locking member 2 does not break through the critical state. Therefore, the elastic member 3 can make the locking member 2 to lock the lifting platform 6.

The lifting platform 6 is controlled to be further lifted, and the reset member 62 located at the bottom of the lifting platform 6 pushes the locking portion 21 back into the mounting cavity 111. In this case, the unlocking portion 22 is driven by the locking portion 21 to stretch out of the mounting cavity 111 and the locking member 2 is in the unlocked state (as shown in FIGS. 7 and 8). In this process, since the reset member 62 pushes the locking portion 21 to do a greater displacement, which enables the locking member 2 to break through the critical state, and the elastic member 3 keeps the locking member 2 in the unlocked state.

The lifting platform 6 is controlled to be lowered (as shown in FIGS. 9 and 10), the reset member 62 located at the bottom of the lifting platform 6 pushes the unlocking portion 22 back into the mounting cavity 111. In this case, the locking portion 21 is driven by the unlocking portion 22 to stretch out of the mounting cavity 111 and the locking member 2 is in the locked state for locking the lifting platform 6 in a next motion. In this process, the reset member 62 enables the locking member 2 to break through the critical state and enter the locked state from the unlocked state, and the elastic member 3 enables the locking member 2 to lock the lifting platform 6 during the next lifting motion of the lifting platform 6.

According to the storage cabinet in the embodiment of present application, suspending can be achieved even if power-off and reset can be achieved by manual operation when power-off, and the storage cabinet is especially suitable for a lifting structure of the lifting drawer of the refrigerator. When the lifting drawer is lifted to the highest point, suspending can be achieved through a mechanical structure. When the lifting drawer needs to be lowered, automatic unlocking can be achieved through the reset member 62 by using an ordinary motor instead of high-cost special motors with locking functions (such as stepper motors with electromagnetic lock).

Finally, it should be noted that the above embodiments are only used to explain the solutions of the present application, and are not limited thereto; although the present application has been described in detail with reference to the foregoing embodiments, it should be understood by those skilled in the art that they can still modify the solutions documented in the foregoing embodiments and make equivalent substitutions to a part of the features; these modifications and substitutions do not make the essence of the corresponding solutions depart from the scope of the solutions of various embodiments of the present application.

The implementations above are only used to illustrate the application, but not to limit the application. Although the application has been described in detail with reference to the embodiments, those skilled in the art should understand that various combinations, modifications, or equivalent replacements of the solutions of the application do not depart from the scope of the solutions of the application, and should all cover the scope of the claims of this application.

What is claimed is:

1. A locking assembly, comprising:
    a mounting member;
    a locking member, rotatably connected to the mounting member and configured to be switched between a locked state and an unlocked state, wherein the locking member comprises a locking portion and an unlocking portion; and
    an elastic member, having a first end rotatably connected to the mounting member and a second end rotatably connected to the locking member; wherein
    in the locked state, at least part of the locking portion is located at a motion path of a to-be-locked member and the unlocking portion is located at an avoidance path of the to-be-locked member, and
    in the unlocked state, the locking portion is located at the avoidance path and at least part of the unlocking portion is located at the motion path, and the elastic member is in a compressed state to make the locking member be stuck.

2. The locking assembly of claim 1, wherein the mounting member comprises a guide groove, and
    the elastic member, having the first end fixed to a bottom wall of the guide groove and the second end slidably matched with the guide groove;
    a state switching member, having an end rotatably connected to the second end and another end rotatably connected to the locking member.

3. The locking assembly of claim 2, wherein the locking member is connected to the state switching member at a first point of rotation, the locking member is connected to the mounting member at a second point of rotation, the state switching member is connected to the elastic member at a third point of rotation; the locking member is configured to be switched among the locked state, a critical state and the unlocked state.

4. The locking assembly of claim 2, wherein in the locked state, the elastic member is in a deformed state.

5. The locking assembly of claim 1, wherein the mounting member comprises a mounting housing and a mounting base,
- an inner wall of the mounting housing defines a mounting cavity in which the mounting base is located, and the locking member is rotatably connected to the mounting base,
- in the locked state, at least part of the locking portion stretches out of the mounting cavity and the unlocking portion is located in the mounting cavity,
- in the unlocked state, the locking portion is located in the mounting cavity and at least part of the unlocking portion stretches out of the mounting cavity.

6. A drawer assembly, comprising:
locking assemblies of claim 5; and
a lifting platform
wherein a number of the locking assemblies is two, and the two locking assemblies are located on left and right sides of the lifting platform, respectively,
outer side walls of both the mounting housings together define a lifting space, the lifting platform is liftably provided in the lifting space and configured to be switched between a suspending state and a free state, and
the lifting platform comprises a locking groove, and at least part of the locking portion matches in the locking groove in the suspending state.

7. The drawer assembly of claim 6, wherein a bottom of the lifting platform comprises a reset member,
the reset member is configured to push the locking portion or the unlocking portion during the lifting and lowering of the lifting platform, to make the locking member switch between the locked state and the unlocked state.

8. The drawer assembly of claim 7, wherein the reset member comprises a reset plate or a reset roller.

9. The drawer assembly of claim 6, wherein an inner drawer for storage is provided on the lifting platform and is configured to be lifted and lowered as the lifting platform is lifted or lowered.

10. A storage cabinet, comprising:
the drawer assembly of claim 6.

11. The locking assembly of claim 1, wherein the mounting member comprises a mounting base, and the locking member is rotatably connected to the mounting base.

12. The locking assembly of claim 1, wherein the locking member comprises a manipulator,
the manipulator is configured to drive the locking member to switch from the locked state to the unlocked state, and the mounting member comprises an operating hole for the manipulator.

13. The locking assembly of claim 1, wherein
one of the locking member and the mounting member is provided with a cushioning member, and
the cushioning member abuts against the other of the locking member and the mounting member in the locked state.

* * * * *